United States Patent [19]

Homan

[11] Patent Number: 5,415,776

[45] Date of Patent: May 16, 1995

[54] HORIZONTAL SEPARATOR FOR TREATING UNDER-BALANCE DRILLING FLUID

[75] Inventor: Edwin D. Homan, Chestermere, Canada

[73] Assignee: Northland Production Testing Ltd., Alberta, Canada

[21] Appl. No.: 236,443

[22] Filed: May 2, 1994

[51] Int. Cl.[6] .............................................. C02F 1/40
[52] U.S. Cl. .................................... 210/519; 210/521; 210/539; 210/540
[58] Field of Search ............ 210/519, 521, 522, 532.1, 210/538, 539, 540

[56] References Cited

U.S. PATENT DOCUMENTS

| | | | |
|---|---|---|---|
| 2,879,895 | 3/1959 | McLain | 210/521 |
| 3,399,135 | 8/1968 | Conley, Jr. et al. | 210/521 |
| 4,042,512 | 8/1977 | McCarthy et al. | 210/519 |
| 4,059,517 | 11/1977 | Strahorn et al. | 210/540 |
| 4,202,778 | 5/1980 | Middelbeek | 210/522 |
| 4,243,527 | 1/1981 | Leonard | 210/532.1 |
| 4,247,312 | 1/1981 | Thakur et al. | 210/522 |
| 4,257,895 | 3/1981 | Murdock | 210/521 |
| 4,400,274 | 8/1983 | Prots | 210/521 |
| 4,490,255 | 12/1984 | Johnson | 210/519 |
| 4,515,607 | 5/1985 | Wolde-Michael | 210/526 |
| 4,722,800 | 2/1988 | Aymong | 210/519 |
| 4,940,535 | 7/1990 | Fisher et al. | 210/340 |
| 5,132,011 | 7/1992 | Ferris | 210/539 |
| 5,204,000 | 4/1993 | Steadman et al. | 210/521 |

FOREIGN PATENT DOCUMENTS 958372 5/1964 United Kingdom .
156522 12/1963 U.S.S.R. .

Primary Examiner—Christopher Upton
Attorney, Agent, or Firm—Sheridan Ross & McIntosh

[57] ABSTRACT

The separator comprises an elongated, cylindrical, horizontal pressure vessel. An involute feed inlet introduces the drilling fluid into the top of the vessel chamber at its first end. The feed inlet is designed to reduce the flow velocity of the incoming feed stream and introduce it horizontally toward the first end head of the vessel. A weir, slanted away from the first end head, extends upwardly from a point close to the head's base. The curved head, vessel side wall and slanted weir form an inlet compartment of hopper-like configuration, designed to funnel settling cuttings to a bottom outlet for removal with an auger pump. This design enables the cuttings to be removed while drilling progresses, without the build up of cuttings piles. The vessel also has a second weir at about its midpoint, for trapping fine solids in a second compartment. Riser outlets are provided in the second compartment for water removal and in the third compartment for oil removal. Gas is removed through an overhead outlet.

4 Claims, 2 Drawing Sheets

HORIZONTAL SEPARATOR FOR TREATING UNDER-BALANCE DRILLING FLUID

FIELD OF THE INVENTION

This relates to a separator designed to separate the components of drilling fluid returning from a well undergoing under-balanced drilling.

BACKGROUND OF THE INVENTION

Wells have long been drilled using drilling mud as the circulating medium. The mud performs two functions: it provides a column of heavy fluid that exerts hydrostatic pressure at the bottom of the wellbore, to prevent entry into the wellbore of pressurized hydrocarbons present in the formation being drilled; and it serves to carry solid cuttings up and out of the wellbore.

When drilling mud is used, there is a likelihood that it will penetrate out into a porous and permeable, hydrocarbon-containing reservoir when the reservoir is being opened up or drilled through. When this occurs, the productivity of the well can be adversely affected. The mud that has penetrated radially into the formation acts to impede the flow of hydrocarbons into the wellbore.

Under-balanced drilling was recently developed as a technique for opening up the pay zone of the reservoir. Typically, the well is completed with casing to the top of the pay zone. Then drilling is initiated into the pay zone using a relatively light circulating fluid, such as water or diesel fuel. The fluid is selected so that the hydrostatic head created by it is less than the expected reservoir pressure. Therefore, the drilling fluid will not invade the reservoir as the drilling string penetrates through it.

However, when this is done there is a likelihood that pressurized hydrocarbons (oil or natural gas) present in the reservoir will be produced into the wellbore. Thus the circulated fluid returning out of the wellbore will often comprise oil, water, gas and suspended solids. In addition, this stream will be under pressure and that are adapted to contain the components of the stream while they are separated and recovered as discrete and separate streams.

By way of contrast, a rig operating with drilling mud normally has an "open" tank system for treating a returning mud stream. More particularly, the mixture of mud containing suspended solid cuttings passes through a vibrating screen assembly (known as a "shale shaker") to separate out the bulk of the cuttings, which drop from the shaker onto the ground or into a pit. The mud then enters one or more rectangular, open-topped "mud tanks". The mud slowly moves through the mud tank and most of the fine solids which remain suspended after screening by the shale shaker settle out. Often the mud tank has one or more transverse weirs or baffles, which divide the tank chamber into compartments. The weir functions to trap settling fine solids and thick mud, allowing "cleaned" mud to advance. The cleaned mud then normally is recycled to the wellbore.

From time to time, the rig crew stop the mud flow, drain the tanks into a pit and flush out settled solids using high pressure water jets or hoses.

It is clear therefore that in conventional mud handling systems it is known:
to provide retention time in the tanks to enable the fine solids to settle out; and
to use weirs in the path of the flow, to trap solids and heavily contaminated mud, while cleaner mud passes over the weir and moves toward the tank outlet.

These known concepts are incorporated as part of the present invention.

SUMMARY OF THE INVENTION

The present invention was developed in connection with three prototypes tested in sequence. In the course of building and testing the prototypes, applicants established the needs and means that came to be embodied in the third prototype.

Applicants' first prototype involved using a conventional vessel known as a frac flow back tank. This was a vertical, cylindrical pressure vessel having a limited volume capacity (100 barrels) and comprising:
a bottom outlet for solids removal;
an overhead outlet for gas removal;
outlets at different elevations for separate water and oil removal;
a sparger ring close to the bottom of the vessel chamber so that water could be injected to fluidize and help remove solids out the bottom outlet; and
a feed inlet structure having a T configuration, with its outlet being downwardly directed.

On using this vessel it was noted:
that the volume of the tank was relatively small and the volume of cuttings large. This resulted in having to interrupt drilling periodically to clean the solids from the tank by hooking up a vacuum truck to the bottom outlet to suction out the solids;
that the downwardly directed feed inlet was causing the gassy incoming feed stream to jet down into the liquid and settling solids, thereby stirring them up; and
that the retention time was inadequate, which resulted in the liquid product(s) being contaminated with solids.

At this point, the second prototype vessel was designed, built and tested.

It involved:
A horizontal, elongated, cylindrical pressure vessel having 550 barrels capacity;
An inlet structure that was a tubular involute having its outlet directed horizontally, toward the curved head or end wall of the vessel. The inlet structure was located at about the longitudinal midpoint of the upper section of the vessel chamber. The inlet structure functioned to slow the flow velocity of the incoming feed stream and to introduce it horizontally into the chamber;
A transverse weir extended across the chamber immediately downstream of the inlet structure, dividing the chamber into upstream and downstream compartments. The upstream compartment had sufficient volume to contain all of the coarse solids which the well was expected to produce;
The length of the downstream compartment was sufficient to provide enough retention time to allow the fines (clay and the like) to settle out;
The outlet of the involute inlet structure was spaced above the weir's rim, so that gas could break out and not be entrained in the accumulated liquid;
Oil and water outlet risers were provided downstream of the weir, an overhead gas outlet was provided and solids outlets were provided in the base of the upstream and downstream compartments.

This prototype worked well when tested in terms of providing non-interrupted service. However, it was characterized by one major defect. At the end of the test on a well, it was necessary to open the vessel, purge it with nitrogen and send workers into the gas-laced chamber to shovel the cuttings and silt to the bottom outlets. A vacuum truck was used to suction out the solids. It took two men eight hours to clean out the tank. The work was dangerous and the cost was high. It was now clear that a system, having the capability to remove solids during drilling, was needed.

This led to the design of the third prototype, which involved the desirable features of the second prototype, but further incorporated:

Forming the upstream compartment with a first weir which had its base close to the vessel head (about 30 inches from it) and which slanted upwardly and away from the head, so that the weir, curved head and vessel curved side wall in effect formed a hopper for funnelling settling solids to a solids outlet formed in the vessel side wall at the foot of the compartment;

Providing a solids auger pump connected with the solids outlet of the upstream compartment for removing solids while flow through the vessel continued;

Positioning the involute feed inlet structure over the upstream compartment, to direct the feed stream generally horizontally and toward the adjacent head;

Providing water sparger inlets in the compartment, to fluidize the solids, if required;

Providing a second weir at about the longitudinal midpoint of the vessel chamber, for trapping settling fines and defining intermediate and downstream compartments;

Providing a solids outlet in the base of the intermediate compartment as well as a tubular riser having an elevated outlet for removing water;

Providing an outlet from the downstream compartment, for removing oil; and

Providing manways leading into each compartment.

When tested, it was found that the coarse solid cuttings could satisfactorily be removed from the upstream compartment through its bottom outlet using the auger pump, without interrupting drilling. Upon completion of drilling, inspection showed that the upstream compartment was essentially free of solids. Silt or fines accumulated in the intermediate compartment could be flushed out through the bottom outlet of the intermediate compartment using a pressure hose inserted through the opened manway. Thus the need for men to enter the tank and the need for a vacuum suction truck were eliminated. Cleaning out the tank now involved two men working for about 2 hours.

Broadly stated, the invention comprises a closed separator for separating the components of under-balanced drilling fluid returning from a well to produce separate streams of solid cuttings, gas, oil and water, when present in the fluid, comprising: an elongated, horizontal, cylindrical pressure vessel having a side wall and curved heads which together form a closed internal chamber, said vessel having first and second ends; inlet means for introducing the fluid through an aperture into the upper portion of the vessel chamber at its first end; cuttings outlet means, positioned at the bottom of the chamber at its first end, for removal of solid cuttings; a first weir extending upwardly from the bottom and transversely of the chamber, said first weir being slanted away from the first end head and being sealed to the vessel sidewall, said first weir having its top rim spaced below the inlet means aperture, the bottom end of the first weir being positioned close to the first end head on the downstream side of the cuttings outlet means; the first weir, side wall and first end head combining to form a compartment of downwardly diminishing cross-sectional area, said compartment being shaped to funnel settling cuttings down to the cuttings outlet means; means, connected with the cuttings outlet means, for withdrawing solid cuttings therethrough; gas outlet means for removing gas from the upper end of the chamber; water outlet means, downstream of the first weir, having an aperture for removing water that has settled to the bottom end of the chamber and oil outlet means, downstream of the first weir, having an aperture for removing oil; said water outlet aperture being located below the oil outlet aperture.

DESCRIPTION OF THE PREFERRED EMBODIMENT

Figure 1:
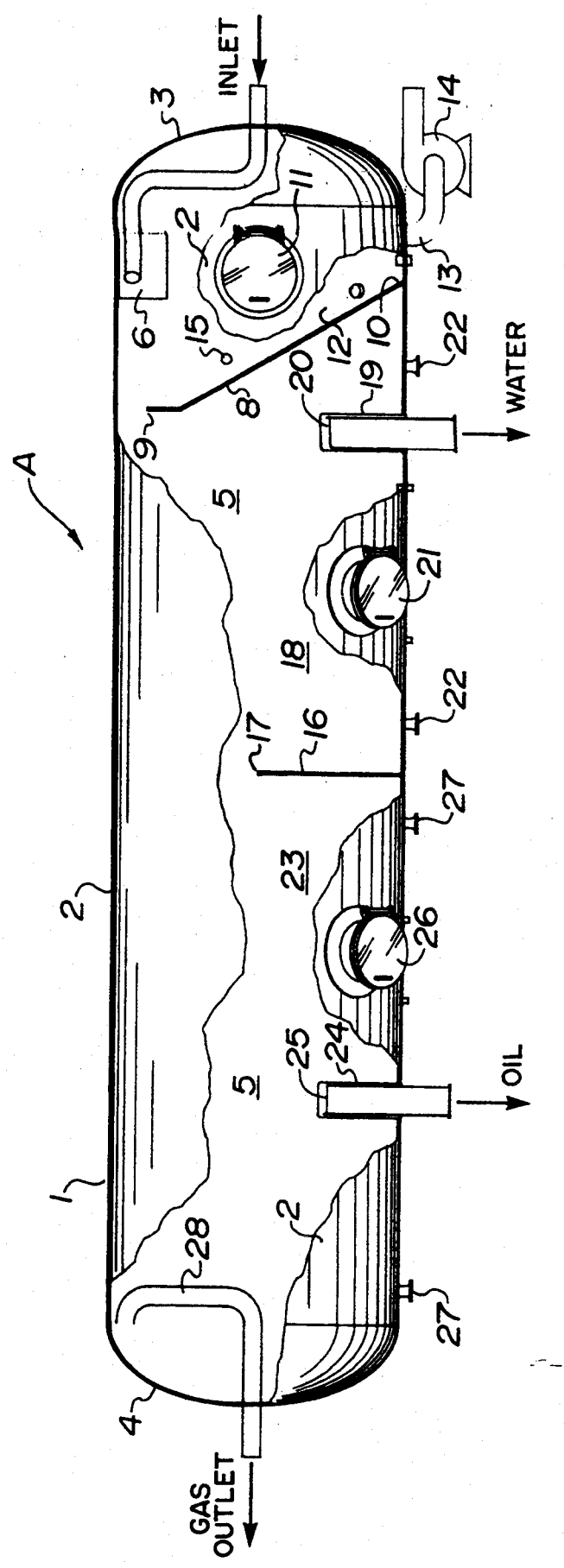
FIG. 1 is a side view in section showing the separator and its internal components.
Figure 2:
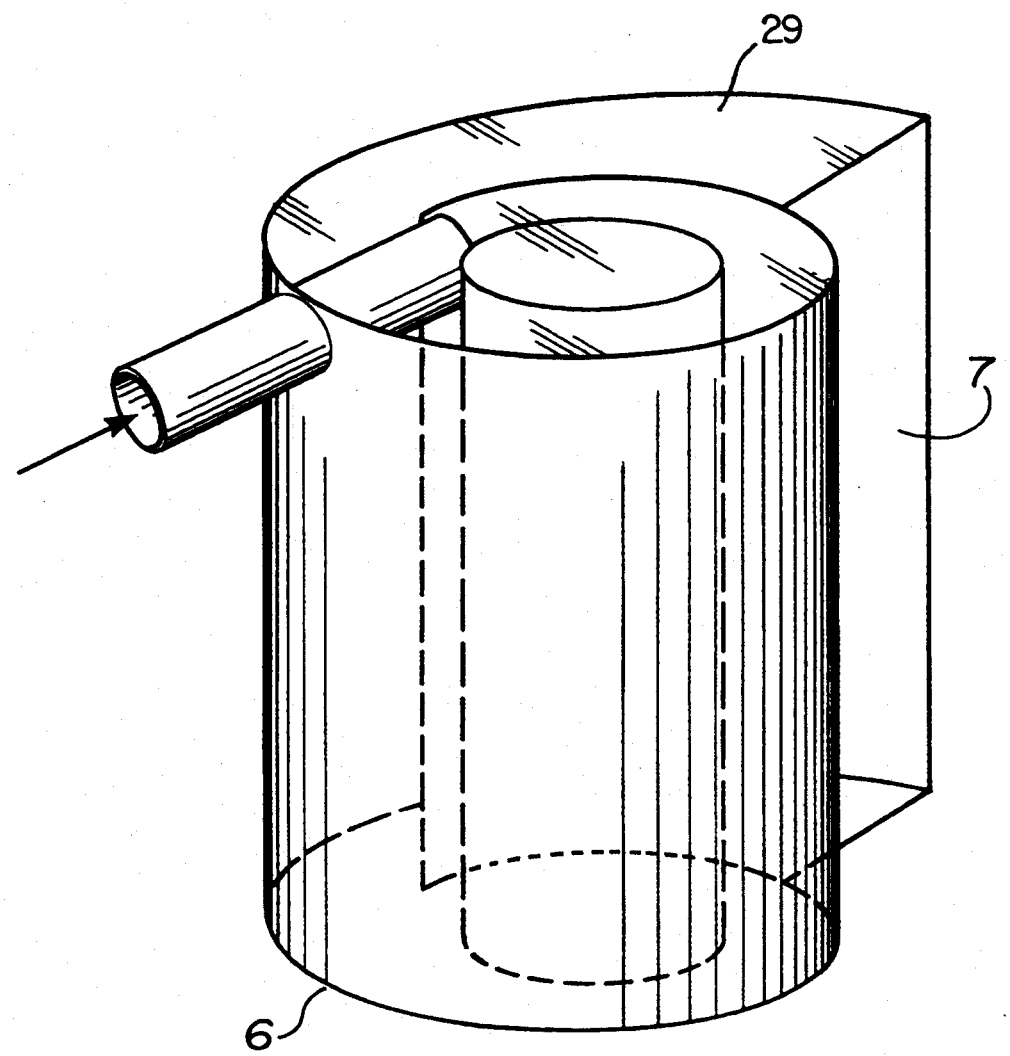
FIG. 2 is a perspective view, in phantom, of the feed inlet.

The separator A comprises an elongated, cylindrical pressure vessel 1 having a side wall 2 and curved heads 3,4 at its inlet and outlet ends. The vessel 1 forms an internal chamber 5.

A feed inlet 6 of increasing cross-section and involute form extends into the upper end of the vessel chamber 5 at its inlet end. The feed inlet 6 has an aperture or outlet 7 opening toward the head 3 along a generally horizontal plane. The feed inlet 6 is therefore operative to reduce the flow velocity of the feed stream as it enters the chamber 5 and to direct it along a horizontal path toward the end head 3. This arrangement is designed to minimize turbulence.

An internal first weir 8 extends upwardly from the bottom of the vessel side wall 2. Its rim 9 is positioned close to but below the outlet 7 of the feed inlet 6. The base 10 of the first weir 8 is close to but spaced from the head 3 (about 30 inches). The weir 8 is slanted away from the head 3 in a downstream direction, at about 45°.

The slanted weir 8, vessel side wall 2 and curved head 3 combine to form an inlet compartment 12 of downwardly diminishing cross-section. In operation, the weir 8, wall 2 and head 3 operate like a hopper to funnel settling cuttings down to the foot of the compartment 12.

The involute feed inlet 6 is positioned over the inlet compartment 12.

The vessel side wall 2 forms a bottom outlet means 13 at the base of the inlet compartment 12, between the weir 8 and head 3. A solids auger pump 14 is connected with the outlet means 13, for withdrawing cuttings from the inlet compartment 12.

Perforated sparging lines 15 extend through the inlet compartment 12, for injecting water, as required, to fluidize settled cuttings and assist in moving them to the bottom outlet means 13.

A second weir 16 extends upwardly from the bottom of the vessel side wall 2 at about the longitudinal midpoint of the chamber 5. The rim 17 of the second weir 16 is positioned at a lower elevation than the rim 9 of the first weir 8. The two weirs 8, 16 and vessel side wall 2 combine to form an intermediate compartment 18. A riser 19 extends upwardly into the intermediate compartment 18 and provides an outlet 20 for removal of water. The outlet 20 is positioned below the rim 17. A manway 21 provides access to the intermediate compartment 18. Capped drains 22 are provided in the bottom of the vessel side wall 2, for removal of flush water and solids when cleaning the intermediate compartment 18.

A third compartment 23 is defined by the weir 16, side wall 2 and outlet end head 4. A riser 24 extends upwardly into the third compartment 23 and provides an outlet 25 for removal of oil. The outlet 25 is positioned beneath the rim 17. A manway 26 provides access into the compartment 23. Capped drains 27 are provided in the bottom of the vessel side wall 2, for removal of oil and flush water when cleaning the third compartment 23.

A gas outlet means 28 extends through the outlet head 4 from the upper end of the vessel chamber 5, for removal of liberated gas.

In operation, the under-balanced drilling fluid is introduced into the upper end of the vessel chamber 5 through the feed inlet 6. Turbulence is minimized by slowing the velocity of the incoming feed stream as it advances through the expanding passageway 29 of the feed inlet 6 and by discharging it horizontally. Contained coarse solid cuttings settle downwardly in the inlet compartment 12 and are funnelled down to the bottom outlet means 13. They are withdrawn through the bottom outlet means 13 by the auger pump 14. Gas breaks out of the feed as it is delivered to the inlet compartment 12. This gas is removed from the chamber 5 through the gas outlet means 28. Liquid overflows the slanted weir rim 9 and is temporarily retained in the intermediate compartment 18. Fine solids still entrained in the liquid settle out and collect on the bottom of the intermediate compartment 18. Oil overflows the rim 17 of the second weir 16. Water is removed from the second or intermediate compartment 18 through the submerged outlet 20 of the riser 19. The oil entering the third compartment 23 is removed through the submerged outlet 25 of the riser 24. At the completion of drilling, the fine solids in the intermediate compartment 18 can be removed by opening the manway 21 and washing them out through the drains 22 with a pressure hose, without entering the vessel chamber 5.

The separator A is characterized by the following advantages:
- coarse cuttings can be removed while drilling is underway and returning fluid continues to enter the vessel chamber 5;
- coarse cuttings and fine solids are removed without requiring men to enter the chamber;
- the need for a vacuum truck, standing by for hours, is eliminated;
- the hopper-like configuration of the inlet compartment prevents accumulation of cuttings piles; and
- the five possible components (cuttings, fines, oil, water and gas) of under-balanced drilling fluid are separated and separately recovered.

THE EMBODIMENTS OF THE INVENTION IN WHICH AN EXCLUSIVE PROPERTY OR PRIVILEGE IS CLAIMED ARE DEFINED AS FOLLOWS:

1. A closed separator for separating the components of under-balanced drilling fluid returning from a well to produce separate streams of solid cuttings, gas, oil and water, when present in the fluid, comprising:
   an elongated, horizontal, cylindrical pressure vessel having a side wall and curved heads which together form a closed internal chamber, said vessel having first and second ends;
   inlet means for introducing the fluid through an aperture into the upper portion of the vessel chamber at its first end;
   cuttings outlet means, positioned at the bottom of the chamber at its first end, for removal of solid cuttings;
   a first weir extending upwardly from the bottom and transversely of the chamber, said first weir being slanted away from the first end head and being sealed to the vessel sidewall, said first weir having its top rim spaced below the inlet means aperture, the bottom end of the first weir being positioned close to the first end head on the downstream side of the cuttings outlet means;
   the first weir, side wall and first end head combining to form a first upstream compartment of downwardly diminishing cross-sectional area, said compartment being shaped to funnel settling cuttings down to the cuttings outlet means;
   means, connected with the cuttings outlet means, for withdrawing solid cuttings therethrough;
   gas outlet means for removing gas from the upper end of the chamber;
   water outlet means, downstream of the first weir, having an aperture for removing water that has settled to the bottom end of the chamber; and
   oil outlet means, downstream of the first weir, having an aperture for removing oil;
   said water outlet aperture being located below the oil outlet aperture.

2. The separator as set forth in claim 1 comprising:
   a second weir extending upwardly from the bottom and transversely of the chamber, said weir being sealed to the vessel side wall and having its top rim spaced below the top rim of the first weir, said second weir being spaced downstream from the first weir, thereby combining with the first weir to define a second intermediate compartment for collecting fine solids and water and combining with the second end head to define a third downstream compartment;
   the water outlet means communicating with the intermediate compartment; and
   the oil outlet means communicating with the downstream compartment.

3. The separator as set forth in claim 2 wherein:
   the fluid inlet means comprises an involute structure forming a passageway of increasing cross-section which terminates at the aperture, so that the velocity of the fluid being introduced into the chamber is diminished as it passes through the passageway.

4. The separator as set forth in claim 3 wherein:
   the aperture of the involute structure is directed toward the first end head.

* * * * *